United States Patent [19]

Francke

[11] 4,117,324
[45] Sep. 26, 1978

[54] CURVE FOLLOWER DEVICE

[75] Inventor: Erwin Francke, Munich, Germany

[73] Assignee: Erwin Sick Gesellschaft mit beschrankter Haftung Optik-Elektronik, Waldkirch, Germany

[21] Appl. No.: 778,608

[22] Filed: Mar. 17, 1977

[30] Foreign Application Priority Data

Apr. 26, 1976 [DE] Fed. Rep. of Germany ....... 2618165

[51] Int. Cl.² .............................................. G05B 1/00
[52] U.S. Cl. .................................... 250/202; 318/577
[58] Field of Search .................. 250/202, 236; 318/577

[56] References Cited

U.S. PATENT DOCUMENTS

| | | | |
|---|---|---|---|
| 3,529,084 | 9/1970 | Rich | 250/202 |
| 3,703,674 | 11/1972 | Doxey | 318/577 |
| 3,995,154 | 11/1976 | Schlick et al. | 250/202 |

*Primary Examiner*—David C. Nelms

[57] ABSTRACT

A curve follower device having an optical scanner head circularly scanning a guide region containing a guide line and a separate code region provided at least on one side of the guide region, the measurement point of the head being a predetermined distance from its pivot point in the direction towards the guide line, and the head being movable along the guide region at a speed considerably slower than the scanning speed and being connected to a control device which forms from the signals delivered by the scanner head, control signals for the movement of the scanner head along the guide line. In the code region marks associated with the guide line as detected by the scanner head are provided in order to initiate further control commands in the control device, the length of the marks being greater than the width of the guide line. After the end of a mark in the code region is detected the control device makes the scanner head continue to travel for a predetermined further distance which is shorter than or equal to the interval of the measurement point from the pivot point.

12 Claims, 5 Drawing Figures

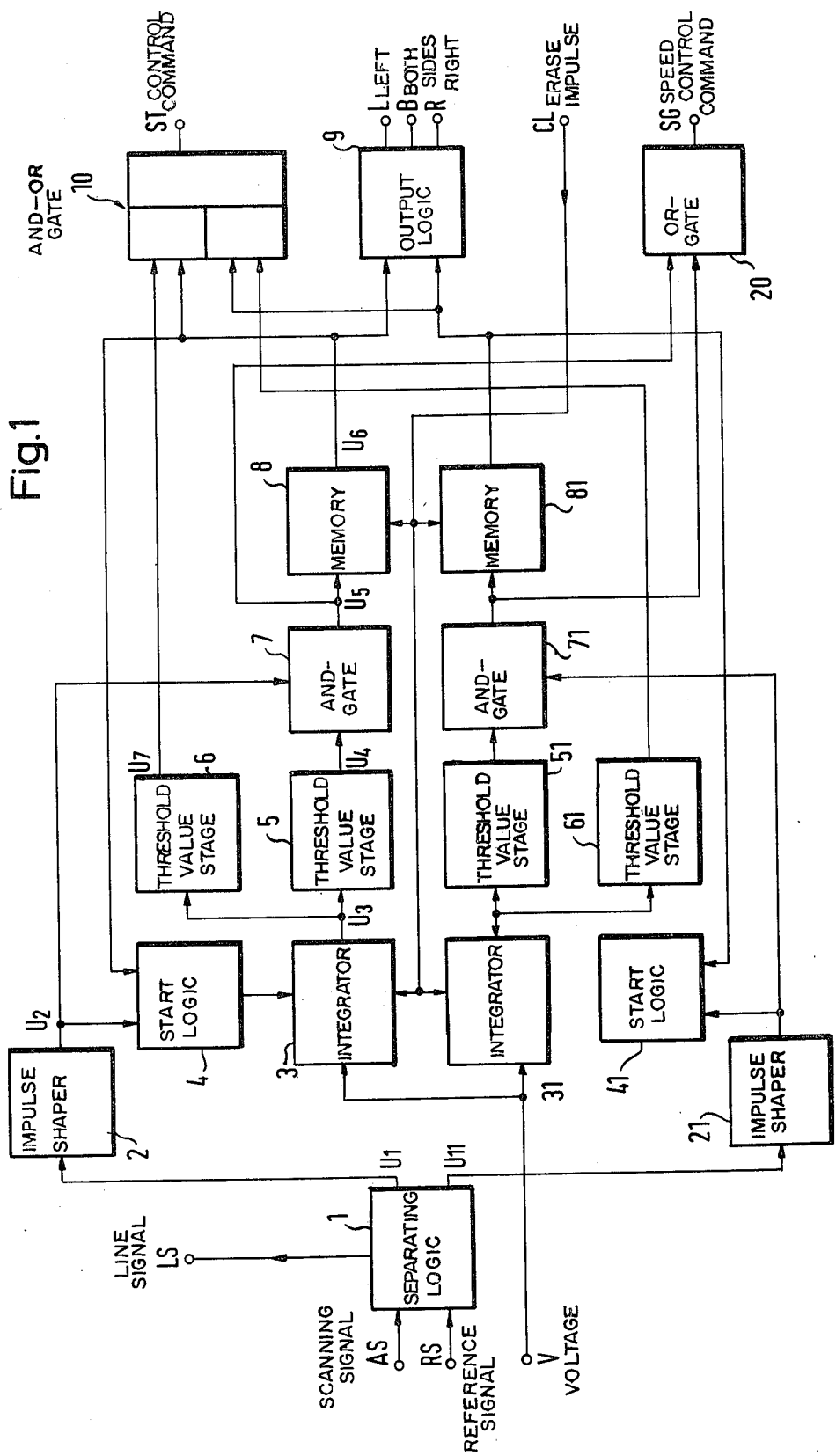

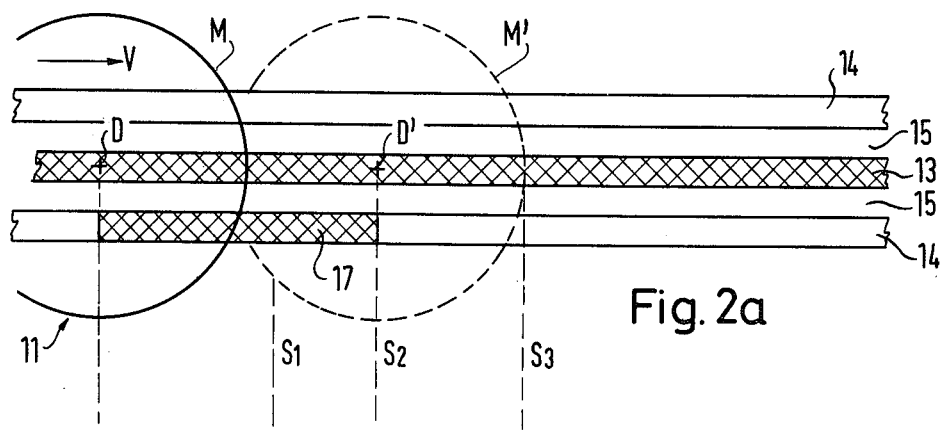
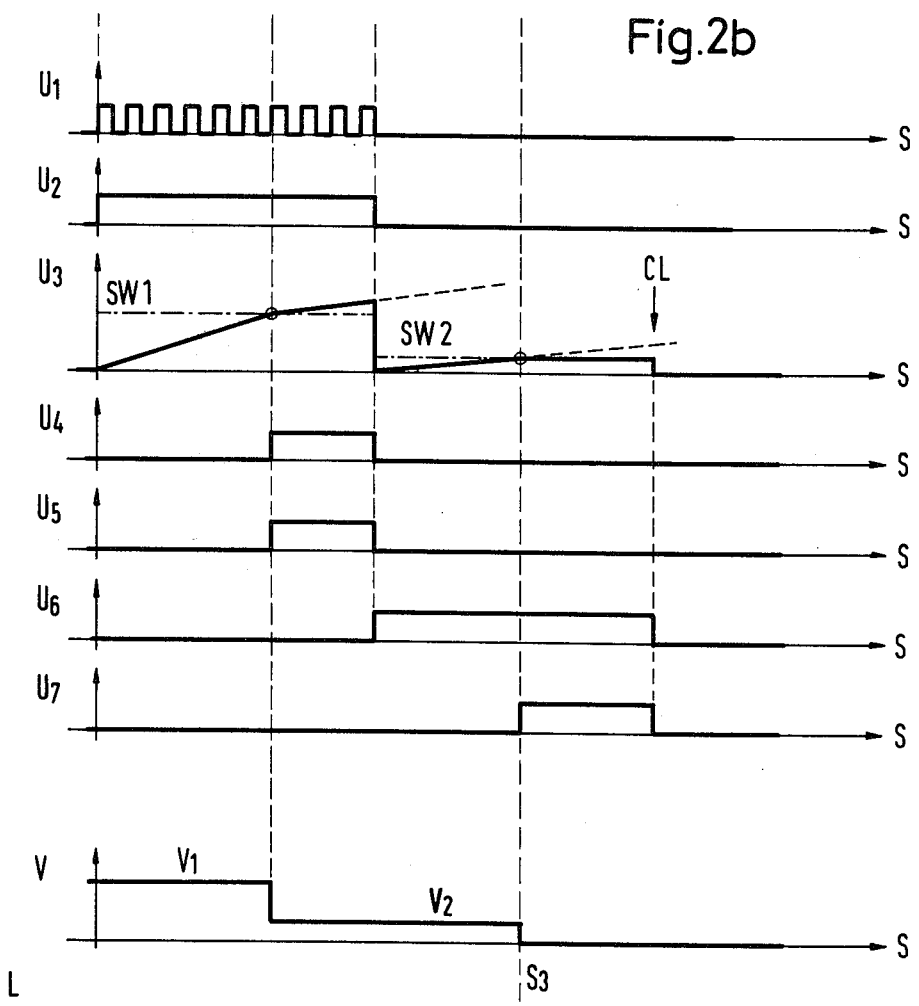

CURVE FOLLOWER DEVICE

The invention relates to a curve follower device having an optical scanner head circularly scanning a guide region containing the guide line and a separate code region provided on at least one side of the guide region, the measurement point of the head being a predetermined distance from its pivot point towards the guide line and the head being moveable along the guide region at a considerably slower speed than the scanning speed and is connected to a control device which forms from the signals delivered by the scanning head, control signals for moving the scanning head along the guide line, whilst in the code region marks associated with the guide line and detected by the scanner head in order to initiate further control commands in the control device are provided, the length of which is greater than the width of the guide line, according to our assignee's copending U.S. patent application Ser. No. 744, 810 filed Nov. 24, 1976.

Devices of this type are used, e.g., for scanning curved paths or tracks previously drawn on templates, and for leading a tool. In these cases the scanner head scans circularly the guide line which possesses a constant width, as is described, e.g., in Federal German Offenlegungsschrift No. 2,204,118. The center point of the circular path in these cases lies on an edge of the line — i.e., the impulses generated by crossing the line edge are utilised for the control system. In such a mode of scanning, impulses appear, e.g., at 0° and 180°, which are evaluated in a suitable electronic evaluation circuit in order, in the event of deviations from the desired arrangement of the circular scanning line with reference to the guide line which is to be followed, to control co-ordinate motors on the scanner head or on the following tool so that any incorrect alignment detected is corrected.

It is the underlying aim of the above-identified U.S. patent application Ser. No. 755,810 to produce a curve follower device of the type defined above, in which no faults in the operation of the device occur in the case of specific variations in the guide line, caused for example by inaccuracies in drawing or by dirt. Even for certain variations in the guide line, therefore, accurate scanning is required to be maintained, such as is required principally for milling or for digitalization from lines. In order to achieve this aim, application Ser. No. 744,810 provides that at least one separate code region is provided at the side of the guide region, and is scanned separately from the guide region.

The present invention deals with the solution of another problem, which arises more particularly in the control of machine tools, the tools of which are required to be controlled not only along a curved path or track, but additionally to perform further functions under control. For example, in the case of milling machines or engraving devices, the mill or the burin has to be lowered or raised at certain points determined with high precision. Although operations of this type can be caused by marks forming a code placed beside the guide line, it has nevertheless been found that the performance, for example of the lowering of the burin in engraving, cannot be performed with sufficiently high accuracy, so that for example the burin is raised just before an intersecting engraved line or else cut beyond it. Similar phenomena are produced in milling by the mill being lifted from the workpiece too early or too late.

It is thus the object of the present invention to produce a curve follower device of the type defined at the outset above, with which an operation which is required to be controlled by the marks provided in the code region is executed at a place predetermined with high precision.

In order to achieve this aim the invention provides that after the end of a mark in the code region is detected the control device makes the scanner head run on for a further predetermined distance which is shorter than or equal to the distance of the measurement point from the pivot point.

This solution of the problem underlying the invention is based on the discovery that in the optical scanner heads of the type defined above which are in use, the measurement point where the guide line is scanned does not coincide precisely with the pivot point of the scanner head. But the pivot point of the scanner head is the reference point of the system, according to which the control tool is guided. The short distance between pivot point and measurement point, of for example approximately 1.5 mm, is unimportant so long as the tool is guided along a closed line or this line exhibits open ends which lead beyond the workpiece on both sides. But if, as in the present case, the tool is required to execute functions, such as for example raising or lowering, in the course of the line, then this operation occurs slightly too early corresponding to the distance between measurement point and pivot point.

The basic idea of the invention is therefore to make the measurement point travel on beyond the end of the mark by a certain "allowed distance" until the pivot point is located precisely on the end of the mark or just in front of it. It is thus achieved in a simple manner that an operation which is required to be controlled by the code marks begins for example precisely at the end of the code.

According to a particularly preferred further development it is provided that when a mark is detected the control device initiates a variation in the speed of the scanner head. The detection of the mark occurs before the passage of the measurement point through the end of the mark, so that, for example by decelerating the scanner head, the system is prepared beforehand for the function to be executed subsequently. Both the machine tool control and the curve follower device possess moving masses, so that the drive system can only react to control commands with a finite time constant. By reducing the speed for the execution of a control command, the required response time is reduced very considerably, so that the operation initiated by the control command, for example the raising or lowering of the burin during engraving, can take place with particularly high precision.

An advantageous embodiment of the device according to the invention is characterized by the provision in the control device of an integrator associated with the code region and fed with a voltage proportional to the instantaneous speed of the scanner head, which delivers, starting from the passage of the measurement point of the scanner head through the start of a mark, a signal proportional to the distance travelled, from which in the control device a speed control command to reduce the speed of the scanner head and a code detection signal are formed when a first threshold value corresponding to a minimum mark length is exceeded, the passage of the measurement point through the end of the mark resets and restarts the integrator, while the code detection signal passes as information into a memory, and the signal of the integrator proportional to the distance travelled by the measurement point after leaving the mark trips a control command when a predetermined second threshold value corresponding to a distance of not more than the interval of the measurement point from the pivot point is exceeded. The use of a precisely operating integrator renders the control device totally independent of the instantaneous speed of the scanner head and hence of inaccuracies in the drive system. The integrator delivers in every case a signal which is proportional to the distance effectively travelled, so that by simple threshold value switches with pre-adjustable threshold values the travelling of a predetermined distance at any arbitrary speed can be precisely determined. By this means on the one hand the minimum code length (which is associated with the first threshold value) can be determined and a mark can therefore be detected, and on the other hand the following of the measurement point through the pre-adjustable second threshold value can also be determined. The two distances travelled, namely the minimum code length and the follow-up of the measurement point, can be adjusted mutually independently. As soon as the measurement point has travelled the minimum mark length, the mark is detected as such and its information content is thereby obtained. Thereupon the speed control command is immediately made available to reduce the speed of the scanner head. The control command controlling the desired operation advantageously appears only when the pivot point of the scanner head, which is regarded as reference point, occupies a quite specific position with reference to the end of the mark.

It is advantageously provided that the magnitude of the second threshold value corresponds to the interval of the measurement point from the pivot point. With this construction it is achieved that an operation which requires to be controlled by the mark commences precisely when the pivot point is exactly on the end of the mark.

When scanning a guide line intersected by a second guide line, it may be necessary for an operation to be initiated precisely when the pivot point of the scanner head, and hence the tool, is positioned exactly in the centre of the intersecting guide line. In this case the mark may adjoin the intersecting guide line — i.e., merge into the latter with no gap. In this case the free rear edge of the intersecting guide line is evaluated as the end of the mark. For this purpose it is preferably provided that the magnitude of the second threshold value corresponds to the interval of the measurement point from the pivot point less half the width of the guide line.

In order that the marks can be detected reliably as such in every case, according to a preferred embodiment it is provided that in the case of guide line intersecting mutually at an angle the length of the marks is greater than the distance $$G = \frac{d}{\sin \alpha} + \frac{c}{\tan \alpha};$$

wherein $d$ is the width of the guide line, $c$ the width of the code region and $\alpha$ the angle imposed by the intersecting guide lines.

A preferred embodiment is characterised by the fact that a triggerable and resettable integrator is provided in the control device and is connected on the output side to a first threshold value stage and a second threshold value stage each with predetermined threshold values, the first threshold value stage and an impulse shaper forming a code signal from the code impulses delivered by the scanner head are fed to the inputs of an AND-gate, the output signal of which on the one hand trips the speed control command and on the other hand sets a memory, while the output signal of the memory resets and retriggers the integrator through a start logic, and is furthermore fed conjointly with the output of the second threshold value stage to the inputs of an AND-OR-gate, at the output of which the control command appears.

It may be advantageously further provided that the memory and the integrator are conjointly resettable by an externally fed erasing impulse. This erasing impulse is for example supplied by the drive device of the controlled tool, when the drive device has received the control command and has detected the nature of the operation to be executed. The code information stored in the control device can then be erased.

According to an advantageous further development, it may be provided that a code region containing marks and separated from the guide line by a dead region is provided on both sides of the guide line. This is advantageous particularly when different types of operations are required to be tripped by the control command, in which case the nature of the operation is determined by the presence of one or of two marks in the two code regions. Thus three recognizable informations are possible, namely mark left, mark right, mark both sides. The dead region between the guide line and the code regions permits a particularly clear-cut separation of the signals delivered by the scanner head. The arrangements of marks described in U.S. patent application Ser. No. 744,810 may also be advantageous.

It is preferably provided that the marks in the two code regions possess a length differing by a predetermined distance. In this case it is particularly preferred that the predetermine distance is longer than or equal to the interval between center point and pivot point.

A particularly preferred embodiment appropriate for evaluation of two code regions provides that a processing channel is provided in the control device for each of the code regions, each with an integrator, two threshold value elements, and AND-gate and a memory, that the outputs of the memories and of the second threshold value elements are applied to paired inputs of the AND-OR-gate in order to form the control command, that the outputs of the AND-gates are combined through an OR-gate in order to form the speed control command, and that the outputs of the memories are connected to a decoding output logic. In this case the marks in the two code regions are initially measured and possibly detected in complete mutual separation, while the information which they prescribe is stored separately in each case. Only in the decoding output logic are the informations of the two code regions associated together and deliver three useful overall informations. In the formation of the control command, first of all the conditions of one processing channel in each case are linked through an AND-function and then combined through an OR-function. By this means it is achieved that a control command appears whenever a mark in one of the two code regions or else in both code regions has been checked and evaluated in the described manner.

It is preferably provided that the control command causes the stoppage of the scanner head.

The invention is explained more fully hereinbelow with reference to an embodiment by way of example and to the accompanying drawing, wherein:

FIG. 1 shows a block circuit diagram of the control device of the curve follower device for two code regions;

FIG. 2a shows a schematic view of the guide line with the code regions on both sides and with a mark, in which the scanner head is indicated symbolically by its pivot point and its measurement point;

FIG. 2b shows in the form of graphs voltages appearing in the control device as a function of the distance travelled by the scanner head and in schematic association to FIG. 2a;

Figure 3:
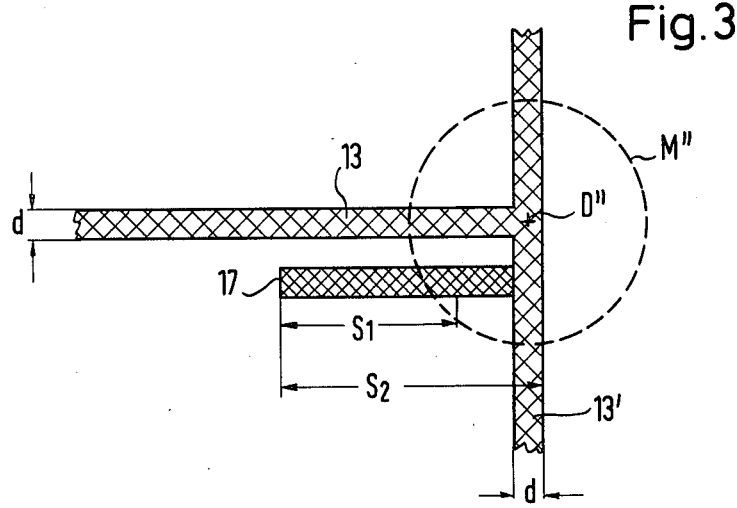
FIG. 3 shows a T-shaped arrangement of guide lines, in which the mark touches the intersecting guide line.

As is illustrated schematically in FIG. 2a, a guide line 13 of constant width, which may occupy the total width of the guide region, is arranged in the scanning region of a scanner head. The code regions 14, which are separated from the guide region by the dead regions 15, are arranged on both sides of the guide line 13 and parallel to the latter. Marks 17 may be arranged in the desired positions on one or on both sides of the guide line within the code regions. The length of a mark 17, considered in the longitudinal direction of the guide line, is always greater than the width of the guide line, in order that the mark can be reliably distinguished from any intersecting guide lines.

The scanner head 11 is represented symbolically by its pivot point D and the position of its measurement point M. This scanner head is arranged at an interval above the guide line 13 and can be moved in a horizontal plane by co-ordinate motors. This scanner head 11 may be constructed in conventional manner; it scans the guide line and the code regions along a circular path in the transverse direction and delivers scanning impulses to the connected control device which contain informations as to the position of the guide line with reference to its pivot point and as to the possible presence of a mark in one or in both of the code regions. The impulses associated with the guide line 13 and the impulses associated with the code regions may be mutually separated by optical shutters, but in practice it is found advantageous to effect the separation of the impulses by electronic shutters in the control device.

The impulses originating from the guide region are used to steer the scanner head 11, whilst the code impulses are used to derive control command, more particularly informations for the operation of the controlled tool (milling cutter, burin, laser beam, etc.).

The scanning signal AS on the scanner head 11 is fed together with a reference signal RS to the control device illustrated as a block circuit diagram in FIG. 1. The control device comprises on the input side a separating logic 1 which, by making use of the reference signal RS, separates the scanning signal AS by electronic means into the guide line signal LS associated with the guide line 13 and into the code impulses $U_1$ for the left hand code region and the code impulses $U_{11}$ for the right hand code region. From this point in the circuit the code impulses are further processed in two separate but identical channels. The corresponding circuit blocks of the two channels are identical in each case and are therefore marked with similar reference numerals in the drawing. The circuit block 2 in the left hand channel corresponds to the circuit block 21 in the right hand channel, 3 corresponds to 31, 7 corresponds to 71, etc. Hereinbelow, only the signal processing in the left hand channel will be explained in detail, since the operations in the right hand channel proceed in similar manner.

First of all the code impulses $U_1$ of the left hand channel having been sorted out by the separating logic are fed to an impulse shaper 2. As is shown in FIG. 2b as a graphic representation of the individual voltages as a function of the distance travelled by the scanner head, code impulses $U_1$ are delivered from the appearance of a code mark 17 under the measurement point M of the scanner head 11, namely until the measurement point M leaves the rear end of the mark 17 after a distance $s_2$. These code impulses $U_1$ are reshaped in the impulse shaper 2 into a code signal $U_2$ forming their envelope line — i.e., the length of the code signal corresponds to the length of the mark. The code signal starts, through a start logic 4, a precise integrator 3, to which a voltage V proportional to the speed of the scanner head is fed on the input side (just as to the integrator 31 in the right hand channel). This voltage V is integrated in the integrator 3 so that at the output of the integrator there appears a voltage $U_3$ which is proportional to the travelled scanning distance $s$. The voltage $U_3$ is fed to a following first threshold value stage 5 with the predeterminable first threshold value $SW_1$, which then delivers a signal $U_4$ at the output when the voltage $U_3$ exceeds the first threshold value $SW_1$. This first threshold value $SW_1$ corresponds to the minimum length of the mark 17. An impulse $U_4$ can therefore appear only when the mark 17 exhibits a minimum length, so that a reliable differentiation of the mark from dirt or from intersecting guide lines is already possible at this point. But it is not sufficient for the mark to exhibit just a minimum length; as safety margin a slightly greater length is greater and is verified by feeding the output signal of the impulse shaper 2, together with the output impulse $U_4$ of the first threshold value stage, to an AND-gate 7. A signal appears at the output of this AND-gate 7 only when both of the input voltages $U_2$ and $U_4$ are applied, i.e., when the effective length $s_2$ of the mark is greater than the minimum mark length $s_1$. The output signal $U_5$ of the AND-gate 7 therefore indicates that a mark is present in the left hand code region and that this mark has been detected as such. According to the invention this information is applied as voltage $U_5$ together with the corresponding voltage at the output of the AND-gate 71 in the right hand channel, to a common OR-gate 20, at the output of which a speed control command SG apears when a mark has been detected either in the left hand or in the right hand code track. This speed control command is preferably passed to the drive of the scanner head and controlled tool and reduces their speed $V_1$ in preparation for executing the control command announced by the mark. This is found quite particularly advantageous if the scanner head and the tool are stopped completely in order to execute the control command, since due to the inertia of the drive systems a sudden stoppage from full speed would result in inaccuracies.

Simultaneously the output impulse $U_5$ of the AND-gate 7 is applied to the input of the memory 8, which may be constituted for example by a bi-stable flip-flop stage. The negative — i.e., the falling — flank of the output impulse $U_5$, which coincides with the passage of the measurement point M through the end of the mark 17, sets the memory 8 whereby the information given by the mark is stored. This causes the appearance of the output of the memory 8 of a signal $U_6$ which is fed back to the start logic 4 connected to the integrator 3 and causes the integrator to be reset and simultaneously restarted immediately upon the appearance of the signal $U_6$. Now, correspondingly to the reduced speed $V_2$ of the scanner head 11, the output voltage of the integrator rises with a reduced slope proportionally to the distance $s - s_2$ travelled by the scanner head since the exit of the measurement point from the mark 17. The output signal $U_3$ of the integrator is also, as illustrated in FIG. 1, connected to a second threshold value stage 6 or 61 in the right hand channel. As soon as the threshold value $SW_2$ of the second threshold value stage 6 is exceeded, a signal $U_7$ appears at the output of the second threshold value stage. The threshold value $SW_2$ is chosen so that the distance $s_3 - s_2$ travelled since the exit of the measurement point M from the mark 17 corresponds exactly to the distance of the pivot point D of the scanner head 11 from the measurement point M. The voltage $U_3$ therefore attains the threshold value $SW_2$ exactly when the pivot point D stands above the end of the mark 17. This situation is illustrated by dashed lines in FIG. 2a, where the pivot point and the measurement point are indicated by the reference numerals D' and M'. The distance predetermined by the threshold value $SW_2$ corresponds to the "allowed distance."

The output signal of the threshold value stage 6 and the output signal $U_6$ of the memory 8 are linked together through an AND-OR-gate correspondingly to an AND-function. In the same way the corresponding signals of the right hand channel, i.e., the output signals of the memory 81 and of the threshold value stage 61 are linked in the AND-OR-gate 10 correspondingly to a second AND-function. The results of the two AND-functions are fed in accordance with an OR-function to the output of this stage as control command ST. This control command is transmitted to the drives of scanner head and tool. Because the control command ST appears exactly when, according to the above-mentioned example, the pivot point of the scanner head 11 comes to lie precisely on the end of the mark, it is thereby achieved that an operation which is required to be controlled by the marks in the code regions commences precisely at the end of the code. The OR-function in the AND-OR-gate 10 serves to deliver a control command whenever a mark 17 has been processed in one of the two processing channels or in both.

The output signals $U_6$ of the memories 8 and 81 in the two processing channels are fed additionally to an output logic 9 which serves to decode the code. Depending upon whether a signal appears in the left hand channel or in the right hand channel or in both channels, the decoded information appears at the three outputs of the output logic 9, namely either "mark left" L, "mark right" R, or "mark both sides" B. What significance is attached to each of these three possibilities, i.e., what specific operation is required to be initiated by them, remains a matter for the user of the device. Therefore, a control command ST and the information from the output logic 9, which indicates what type of operation is to be initiated by the control command ST, is always necessary in order to initiate and execute an operation.

After the connected drive device for the tool and the scanner head has received the information and the control command ST, an erase impulse CL is fed to the control device, which resets the memories 8 and 81 on the one hand, but also integrators 3 and 31 on the other hand, so that the control device is brought into readiness for the registration and processing of further marks.

When in a special application, for example for engraving, mutually intersecting code lines 13, 13' are scanned, and the burin of the engraving tool is required to be stopped and lowered or raised in front of a guide line 13 coming to an intersecting guide line 13', as is illustrated by way of example in FIG. 3, the mark 17 in the code region 14 may merge directly with its end into the intersecting guide line 13'. In this case the free boundary edge of the intersecting guide line 13', placed on the right hand side in FIG. 3, is evaluated as the marked end at the end of the mark. So that in this case the burin executes the prescribed function precisely above the center of the intersecting guide line 13', the second threshold value $SW_2$ is chosen so that it corresponds to a lead distance which is shorter by half the width $d$ of the guide lines 13, 13' and the interval of the pivot point D from the measurement point M, i.e., $s_3 - s_2 - d/2$. In this case a control command is executed exactly when the pivot point is positioned half the line width $d$ before the and of the code mark. This situation is indicated by dashed lines in FIG. 3 by the reference numerals D" and M".

Figure 4:
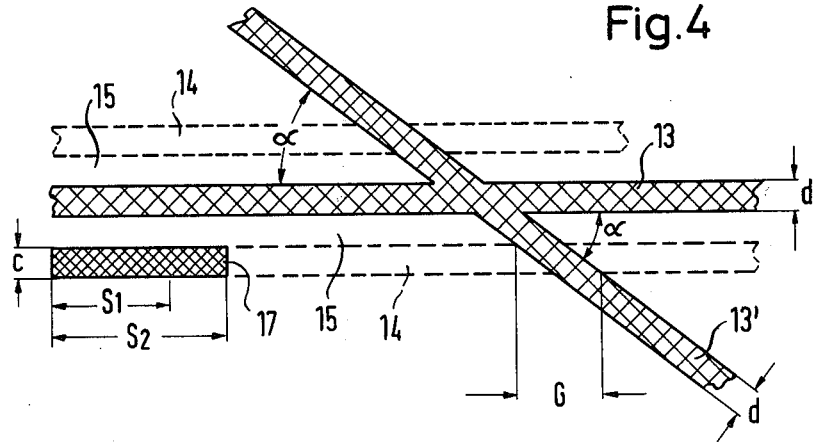
FIG. 4 shows a schematic view of intersecting guide lines in order to illustrate the required mark length as a function of the intersection angle and of the width of the guide line.

The adjustment of the threshold value $SW_2$ to the reduced value which corresponds to the above-mentioned special case can also be performed automatically within the control electronics if a line width memory circuit (not shown in the drawing) is provided, which modifies the second threshold value to the appropriate degree when a T-intersection occurs. The reliable detection of a mark 17 is also possible in the case of guide lines 13, 13' intersecting at an acute angle. This situation is illustrated in FIG. 4. Here it should be borne in mind that for a reliable detection of the mark 17 the minimum mark length $s_1$ must be chosen at least equal to the distance $$G = \frac{d}{\sin \alpha} + \frac{c}{\tan \alpha},$$

where $d$ is the width of the guide line, $c$ is the width of the code region and $\alpha$ is the angle included by the guide lines 13 and 13', as indicated in FIG. 4.

What is claimed is:

1. In a curve follower device having an optical scanner head circularly scanning a guide region containing a guide line and separate code region provided at least on one side of the guide region, the measurement point of the head being a predetermined distance from its pivot point in the direction towards the guide line and the head being movable along the guide region at a speed considerably slower than the scanning speed and being connected to a control device which forms from the signals delivered by the scanner head, control signals for the movement of the scanner head along the guide line, while in the code region marks associated with the guide line as detected by the scanner head are provided in order to initiate further control commands in the control device, the length of the marks being greater than the width of the guide line, the improvement wherein said control device comprises means for stopping the scanner head, after the end of a mark in the code region is detected, only after the head has travelled a predetermined further distance which is not longer than the interval of the measurement point from the pivot point.

2. Device according to claim 1, wherein when a mark is detected the control device initiates a change in the speed of the scanner head.

3. Device according to claim 1, wherein an integrator associated with the code region and fed with a voltage proportional to the instantaneous speed of the scanner head is provided in the control device, which delivers a signal proportional to the travelled distance from the passage of the measurement point of the scanner head through the start of a mark, from which signal, when a first threshold value corresponding to a minimum mark length is exceeded, a speed control command to reduce the speed of the scanner head and a code detection signal are formed in the control device; wherein the passage of the measurement point through the end of the mark resets and restarts the integrator, while the code detection signal passes as information into a memory; wherein the signal of the integrator proportional to the distance travelled by the measurement point after leaving the mark trips a control command when a predetermined second threshold value is exceeded corresponding to a distance of not more than the distance of the measurement point from the pivot point.

4. Device according to claim 3, wherein the magnitude of the second threshold value corresponds to a distance equal to that of the measurement point from the pivot point.

5. Device according to claim 3, wherein the magnitude of the second threshold value corresponds to a distance equal to that of the measurement point from the pivot point less half the width of the guide line.

6. Device according to claim 1, wherein an integrator which can be triggered and reset is provided in the control device, a first threshold value stage and a second threshold value stage with respectively predetermined threshold values connected to the output side of said integrator, an impulse shaper, an AND-gate, a memory, a start logic and an AND-OR-gate; the first threshold value stage and said impulse shaper forming a code signal from the code impulses delivered by the scanner head being fed to the input of said AND-gate, the output signals of said AND-gate tripping the speed control signal and set said memory, while the output signal of the memory resets and retriggers the integrator through said start logic, and is additionally applied together with the output of the second threshold value stage to the inputs of said AND-OR-gate, at the output of which the control command appears.

7. Device according to claim 6, wherein the memory and the integrator are resettable in common by an externally fed erase impulse.

8. Device according to claim 1, wherein code regions each containing marks and separated from the guide line by a dead region are provided on both sides of the guide line.

9. Device according to claim 8, wherein a processing channel is provided in the control device for each of the code regions, each with an integrator, two threshold value elements, an AND-gate, and a memory; the outputs of the memories and of the second threshold value elements being combined to form the control command and inputs linked in pairs of the AND-OR-element in order to form the speed-control command through an OR-gate, and the outputs of the memories being connected to a decoding output logic.

10. Device according to claim 5, wherein the control command causes the stoppage of the scanner head.

11. Device according to claim 8, wherein the marks in the two code regions possess lengths differing by a predetermined value.

12. Device according to claim 11, wherein said predetermined value is greater than or equal to the distance between measurement point and pivot point.

* * * * *